United States Patent Office 3,112,347
Patented Nov. 26, 1963

3,112,347
PROCESS OF PRODUCING INSECTICIDAL
CHLORINATED PINENES
Enzo Amadeo Martinuzzi and Julio Carlos Aragon, both of San Martin 575, Buenos Aires, Argentina
No Drawing. Filed Feb. 17, 1960, Ser. No. 9,174
2 Claims. (Cl. 260—648)

The ever increasing resistance shown by insects towards chemical products in general, which are used in their destruction, creates a serious problem. Thus in the case of chlorinated hydrocarbides, as for instance hexachlorocyclohexane, polychlorinated camphene, etc., which for certain insects it is necessary to employ each time in greater concentrations of active products, and a larger number of treatments is necessary in order to obtain the same results.

The nature of the mechanism by which the insect is ever more resistant to the insecticide is not generally known, although a general supposition is that of the modification of the metabolism which annuls the toxic effects of the active substances. It has been noted that one of the forms of benumbing the defending mechanism of the insect, is that of employing a mixture of active principles of different chemical structures.

Our recent investigations in this particular sense consisted fundamentally in finding mixtures of chlorinated products and the method of obtaining same, derived from hydrocarbides, with properties of maximum insecticide activity with a minimum of toxicity for domestic animals and which, due to their mixture, renders impossible the assimilation of same in insects and the insecticide action of the product.

Studying the effects of mixtures with chlorinated products we have found that within certain limits, a certain accentuated synergism is observed in the potency of its components. This was verified comparing the insecticide action of the principal components, isolated or in mixtures; at the same time is may be observed that the increase in the insecticide activity does not involve an increase in its toxic effect on hot blooded animals; on the contrary, the experiments effected in compared toxicity of polychlor-camphene (with 67–69% chlorine) obtained by chlorinating synthetic camphene (F.P. 50° C.) and polychlor-camphane (with 67–69% of combined chlorine) obtained from pinene clorhydrate (bornile chloride) borneol (F.P. 124–124.5° C.; $a_D^{25°}$=15.6° in chloroform) with the insecticide components of this invention, shows this last as that possessing less toxicity in hot blooded animals. In this sense mixtures are already known which include a bicyclic terpene and polychlorinated limonene or dipentene up to 69% of combined chlorine, showing a low toxic power in animals understanding hot-blooded animals.

The mixture of chlorinated hydrocarbons of this invention have been obtained in all cases parting from alpha pinene, mixtures of alpha pinenes and beta (containing as minimum 70% alpha) or essence of turpentine containing 95% of pinenes as minimum in the proportion already stated, through a process consisting in two very different phases: the first consisting in reactivating the hydrocarbons with a mixture of dry gases of hydrochloric acid and chlorine, cooled, for maintaining the reaction within certain temperature limits, until no further rise in temperature is noted in the reactions; the second phase consists in reacting the product of the former phase with hot chlorine until the final product reaches a proportion in weight of the combined chlorine of between 62 and 69%.

I. ATTAINMENT OF THE MONOCYCLIC AND BICYCLIC MIXTURES

The first phase for preparing the process of the insecticide compound of this invention consists in reacting the alpha pinene, mixtures of alpha and beta pinenes or essences of turpentine with a mixture of gases of hydrochloric acid and dry chlorines, cooled, so as to obtain a mixed compound of hydrocarbides partially chlorinated, destined to the second phase of the process for obtaining the former polychlorinated mixture. When the proportion of chlorine in the mixture of gases increases, the proportion of bicyclic components in the resulting products decreases, being an increase of the other components, especially the monocyclic. These last components constitute mixtures which are very difficult to separate and distill from a E.P. of 70° C. at 15 mm. Hg, up to 160° C. at 15 mm. Hg. At this high rate of ebullition, two factors may be considered as fundamental; the structure of hydrocarbons and the percentage of combined chlorine. Analytically, by dishalogination, we have only identified the limonene, or dipentene, the terpinolene and the p-cimene (dipentene $C_{10}H_{16}$); this last can also be formed by dehydrochlorination of the hydrochlorate of dipentene. With the increase of percentage of chlorine in the mixture of gases, these products also increase.

The following examples illustrate this first phase of the process:

Example I

The alpha pinene with the following characteristics:
$E_{b759}$=154.5–155° C.;

$$d\frac{25}{4° C.}=0.856$$

$n_D^{25}$=1,4642; $a_D^{25}$=22.96 (1 dm.)
is treated in a receptacle, exteriorly cooled, with a current of gas, which is a mixture of 90 to 95% of dry gas of hydrochloric acid and 5 to 10% of chlorine gas, also dry, finely pulverized, stirred and regulating the current of refrigerating water so that the reaction is maintained between 25 and 30° C. The composition of the gaseous mixture is controlled by the Philosophoff method (Chem. Ztg. 31, 1256, 1907) modified by Berl, based on mercury, employing a Bunte burette and a graduated level tube. The connecting tube with atmospheric pressure is provided with calcium chloride so as to avoid the entrance of dampness in the reaction receptacle. The reaction is detained when the temperature of same is maintained in constant state without contacting the exterior refrigerating bath.

The product of the reaction is a viscous liquid, with $d$=1.012 which cooled by a refrigerant mixture at −10° C., during the whole night and rapidly filtered by suction, renders a solid white mass and a reddish liquid. The solid has a tendency to partially melt and through re-crystallisation in alcohol, small brilliant leaves of F.P. 124–124.5° C. are obtained and an $a_D^{20}$ 15.6° (in chloroform) The weight of the product is of 50% shown in bornile and isobornile on the original pinene.

The liquid with a specific weight of 0.998 at 19° C., and an $a_D^{20}$=19.8 is distilled in vacuum in a divided column of the Rechenberg type (Einfache und Fraktionierte Destillation, Miltitz 1923) at 15 mm. Hg and the fractions are separated every 5 or 10° C., according to the volume of the fraction. Operating with the maximum refluence, the fractioning is even more difficult; for instance the bornile chloride (including that of isobornile) although obtained in the principle fraction which is of 90–100° C. at 15 mm. Hg part of it always passes before reaching 90° C. as well as some distilled up to 110–115° C. The first fraction distilled at 70–80° C. at 15 mm. Hg is treated with alcoholic soda for three hours. It is distilled by dragging and a fraction of hydrocarbon is obtained which distills between 140° C. and 176° C. at atmospheric pressure. It is again fractioned and only in the last fractionings the p-cimene is identified. It is known that this hydrocarbon is formed by the dehydrochlorination of hydrochlorides of monocyclic terpenes. This fraction is also treated with a diluted solution of permanganate of potassium, cooled, stirred and distilled by dragging; it is dried and fractionally distilled; a hydrocarbon with a typical aromatic odor is obtained with a $d_4^{20}$ 0.858; $n_D^{20}$=1.4896 and an E.P. 175° C., through the method of capillary tube; by oxidation with a hot concentrated solution of permanganate can be obtained, by acidulation, some crystals of F.P. 175° C. (recrystalized in alcohol) which do not depress in the mixture at boiling point with the parahydroxybenzoic acid.

The fraction $Eb_{15}$=80-90° C. is distilled at ordinary pressure between 175 and 185° C.; in this temperature the quantity of bornile chloride distilled is very small, thereby keeping in mind the amount of hydrolyzable chlorine, it may be admitted that this fraction corresponds to the fenchyl and isofenchyl chlorides.

Bornyl and isobornyl chlorides distill principally between 90 and 100° C.; the deposit of crystals generally clog the refrigerating tube and it is necessary to apply "a stroke" of vapor through the shirt in order to allow the distilling process. By a cooling system, with freezing mixture at −10° C., 12% of bornile chloride was separated, in weight, on the original pinene.

The fraction of 100–110° C. having 20.6% of combined chlorine has, generally, an elevated rotative power superior to that of the original pinene, for instance, with the alpha pinene of +22.96 may be obtained a fraction of +33.8. Treated with alcoholic soda for three hours the total chlorine is not hydrolyzed, and it is therefore to be supposed the presence of bornile chloride in said fraction. By distillation of the dehydrochlorinated product, extraction with sulphuric ether and drying the etherous extract with anhydrous sulphate of sodium, evaporation of the ether and distilled in a small column, a principal fraction is obtained with $Eb_{759}$=173–176° C. and another fraction which distills at $Eb_{759}$=180–190° C. By rectification of the principal fraction can be obtained a liquid with a strong limonous odor of E.P.=175–177° C. with a $n_D^{20}$=0.8398 and a rotary power of $a_D^{20}$= +47.5. By the ordinary process the bromination is effected, obtaining a tetrabromide of E.P. 104° C., recrystallized of absolute alcohol; to which corresponds the tetrabromide of limonene.

The other fraction, also rectified, rendered by the capillary tube method at E.P. at atmospheric pressure of 184–186° C., obtains by bromination a tetrabromide of E.P. 114–115° C., corresponding to the tetrabromide of terpinolene.

The fraction 110–115° C. treated with alcoholic soda for three hours cannot hydrolyze the total chlorine of 29%. By dragging a fraction of E.P. 761=174–176° C., at $d_4^{20}$=0.869 and an $a_D^{20}$=+46.80 is obtained. It is bromination and a tetrobromide is obtained which does not depress with limonene. Taking in consideration the percentage of chlorine, the presence of dihydrochloride of limonene can be admitted, although it was not isolated as such. The rest of the liquid is passed in a smaller column distilling from 115 up to 160° C. (last drop). The fraction 115–120° C. has 31.6% of combined chlorine whilst the fraction 150–155° C. has 42.0% of combined chlorine. If it is considered that a dichlorinated derivative $C_{10}H_{16}Cl_2$ corresponds to 34.35% of combined chlorine and a trichlorinated $C_{10}H_{15}Cl_3$ corresponds to a 44.1% of combined chlorine, it results that a polychlorination has taken place in part, although this fraction (115–160) represents in this instance a very small percentage of the total liquid. In this fraction no definite compound has been found.

The approximate composition of the total product of the reaction is the following (only mentioning the identified components and for greater clearness we group them to the series of hydrocarbons from which they are derived):

Monocyclic series (hydrochloride of limonene, terpinolene, etc., 25 to 30%
Bicyclic series (including chloride of bornile, isobornile, fenchyl and isofenchyl) 65 to 70%
Other related compounds, 5%

*Example II*

Parting from alfa pinene with the following characteristics:

$Eb_{758}$154.5–155° C., $d_4^{20}$=0.859; $n_d^{20}$
=1.4685; $a_D^{22}$=20.5 (1 dm.)

Same was treated with a gaseous mixture containing 75% of dry hydrochloric acid and 25% of dry chlorine in the same conditions as in Example I. Through cooling at −10° C. was obtained 38% of bornile and isobornile chloride in weight on the original pinene. In the liquid was obtained by fractioning another 15% of the same chlorine derivate. The other fractions were separated and analyzed in the same manner as in the foregoing example. The same components were identified as in the first example noting a general increase in the weight of the liquid fractions.

*Example III*

Starting from a turpentine essence containing 68% of alpha pinene; 28% of beta pinene; 2.5% of dipentene with the following characteristics: $d_4^{20}$=0.860; $n_D^{20}$= 1.4701 and $a_D^{20}$=21.0. Same was treated with a gaseous mixture of 50% of hydrochloric acid and 50% of dry chlorine, in the same conditions as those of Example I. By cooling at −10° C. was obtained 23% of bornile and isobornile chlorides in weight on the original pinene (alpha beta). The liquid distilled between 76° C. and 156° C. (last drop); the first fraction with 16% of combined chlorine and the last with 41% of combined chlorine. Of the first fractions up to 110° C., and by cooling at −10° C. was obtained 18% more of bornile and isobornile chlorides.

*Example IV*

Starting from alpha pinene, the same as in Example II, it was treated with a gaseous mixture of 75% of chlorine and 25% of gaseous hydrochloric acid under the same conditions as that of Example I. By cooling at −10° C. was obtained 11% of bornile and isobornile chloride in weight on the original pinene. The liquid was fractioned at 15 mm. Hg as already mentioned obtaining the first fraction of 80–85° C. and the last 150–160° C. in a total of 19 fractions. On the first few was obtained by cooling at −10° C., 19% of bornile and isobornile chlorides also calculated on the weight of the original pinene.

II. ATTAINMENT OF POLYCHLORINATED PRODUCTS

The mixtures of polychlorinated products obtained according to each of the foregoing examples are separately chlorinated until reaching different degrees of chlorination, that is, a determined percentage of chlorine organically combined with the object of determining the optimum degree of chlorination in relation to the insecticide activity.

The chlorinating method followed is not a critical factor in the elaboration process of the product. Generally, the chlorinated mixture of the preliminary tests are dissolved in appropriate solvents such as carbon tetrachloride, and same is reacted with chlorine in the presence of ultraviolet rays. Some chlorinations can also be prepared without solvents using other catalysts such as iodine, red phosphorus and organic peroxides; also employing solar light and the light of tungsten filament as catalysts. The polychlorinated products resulting possess practically the same insecticide properties, only noticing a difference in color. The temperature is not a critical factor, it not being convenient to overpass 150° C., as decomposition may take place as well as possible molecular effects.

The following examples show some of the processes of chloration in the manufacturing of insecticides:

*Example V*

In a chlorinating receptacle a mixture is prepared with partially chlorinated products of Example I and dissolved in two parts by weight of carbon tetrachloride. Chlorine (finely divided) is passed through the liquid highly illuminated by common incandescent lamps with tungsten filaments (200 watt) set within a Pyrex glass tube in the liquid. It is necessary to start heating at a temperature of 60°–62° C., and thereafter a reaction follows by itself, as it is exothermic and the temperature is maintained between 69–71° C. (towards this, cold or hot water is circulated through the shirt of the chlorinator). The reaction was stopped 75 hours later when the combined chlorine reached 68.0%. Every five hours samples were taken out and after eliminating the solvent and vestiges of same as well as the gases of the hydrochloric acid, a dragging is effected with air until the product loses the odor of hydrochloric acid; a viscous yellow product is obtained with a slight terpenic odor. The progressive steps of the chlorination was as follows:

Time:Hours  0 : 5 :10 :15 :20 :25 :30 :35 :40 :45 :50 :55 :60 :65 :70 :75

Percent Cl  23.8:37.5:43.3:47.0:51.0:54.5:57.0:59.2:61.0:62.5:63.8:64.9:65.9:66.8:67.6:68.0

*Example VI*

The same base of partially chlorinated hydrocarbons was chlorinated, following the method described in Example V but employing an ultraviolet light burner, also inserting in same a Pyrex glass tube. A yellowish viscous product is obtained with 67.5% of combined chlorine.

The steps of the reaction were as follows:

Time:Hours  0 : 5 :10 :15 :20 :25 :30 :35 :40

Percent Cl  23.5:38.3:47.0:52.0:58.6:62.1:64.7:66.2:67.5

*Example VII*

The same mixture of hydrocarbons partially chlorinated of Example I is chlorinated without any solvent. In a glass receptacle, with heating bath, it was heated so as to maintain the reaction mass between 100° and 110° C. Chlorine was passed while the reaction mass was illuminated by an ultraviolet light burner, set in a Pyrex glass tube inserted in the liquid. After 55 hours, when the mixture reached 67.1% of chlorine, the passage of chlorine is stopped, and air is introduced up to the elimination of the hydrochloric acid odor. A viscous deep yellow liquid is obtained; it is noted that this product tends to decompose, showing vestiges of hydrochloric acid, dampness accelerates the decomposition reaction.

The course of the reaction was the following:

Time:Hours  0 : 5 :10 :15 :20 :25 :30 :35 :40 :45 :50 :55

Percent Cl  23.6:34.8:43.1:49.1:54.3:57.9:60.0:61.8:63.4:64.8:66.1:67.1

*Example VIII*

The mixture was partially chlorinated as in Example II which products were dissolved in two parts of tetrachloride in the manner shown in Example VI, that is, employing an ultraviolet light burner. A product of 68.2% of combined chlorine is obtained.

*Example IX*

The mixture of partially chlorinated products of Example III is dissolved in two parts of tetrahcloride and chlorinated in the presence of ultraviolet rays up to a content of 68.0K of combined chlorine.

*Example X*

The mixture of hydrocarbons partially chlorinated of Example IV is dissolved in tetrachloride and chlorinated in the presence of ultraviolet rays up to a content of 67.8% of combined chlorine.

III. PREPARATION OF INSECTICIDE COMPONENTS

The different manners of applying the polychlorinated products obtained in the foregoing examples, may be the following.

(a) In solution, a solvent as deodorated kerosene, in concentrations of 0.1% to 5%.

(b) Emulsified liquids prepared with the chlorinated products, an aliphatic solvent, for instance kerosene, or aromatized, such as xylene and an emulsifier that may be ionic such as sulfuric ester of fatty alcohols, or non ionic, such as fatty acid esters of the polyethyleneglycol. An emulsifiable liquid may be prepared with a concentration up to 800 grams of chlorinated product per liter, rendering emulsions in water of great stability.

(c) Powders, prepared by mixtures of chlorinated products, in any proportion of inert ingredients, as for instance talcum. Wetting powders were also prepared incorporating to the above mentioned a dispersion-humidifier product such as a mixture of fatty acid ester of polyethyleneglycol and sulphonated fatty acid alcohols.

IV. TOXIC TESTS

The poisonous display of same was tested with animals, using for same the polychlor camphene with 68% of Cl combined. The application on the animal's skin in the experiments was done on the shaved abdomen. Cobays were used, and the dose of the insecticide product was maintained in contact with the skin by means of plastic paper surrounding the body of the animal and affixed at each end with gauze bandage. Pure insecticide products were applied, that is to say, the drug proper, and emulsifiable at 60% (60 grams of drug and 40 grams of aliphatic solvent and fatty acid esters of polyethyleneglycol.

RESULTS

| Insecticides | Dose of active product mg./kg. | Toxicity |
|---|---|---|
| Example V | 230 | There were no deaths or important symptoms of intoxication. Only irritations were noted on the skin. In the case of free and emulsifiable polychlorocamphane this provoked a beginning of ulceration with scaling and posterior forming of new skin. |
| Example VI | 220 | |
| Example VII | 230 | |
| Example VIII | 230 | |
| Example IX | 230 | |
| Example X | 230 | |
| Polychlorocamphane with 68% Comb. Chl. | 230 | |

*Pulverization (Spraying)*

(a) *On hens.*—Emulsions of 5% and 1% were sprayed with 5 mg./cc. and 10 mg./cc. of pure insecticide. The emulsion was applied one a week during five consecutive weeks by means of a common sprayer on the skin and feathers of the birds until the liquid dribbled.

*Results.*—There were no deaths or symptoms of intoxication on birds, nor any ill results were noted during the 6 weeks of trial.

(b) *On cattle.*—Milking cows three or four years old were sprayed with emulsions containing 5 mg./cc. and 10 mg./cc. of all insecticide products. To this end was used a pulverizing machine under pressure, with knapsack of the garden type, until the product dripped. This was done for five weeks, spraying weekly.

*Results.*—No toxic action was noted on the animals, either clean or those with parasites.

By Mouth (Orally)

The poisonous effects by mouth of the insecticides of this invention was tried on cobays, dissolving the drug in sunflower oil in a concentration of 200 mg./cc. Cobays were employed weighing between 340 and 390 grams.

RESULTS

Insecticides:

Example V — $DLM=400$ mg./kg.; $DL_{50}=250$ mg./kg.
Example VI — $DLM=400$ mg./kg.; $DL_{50}=250$ mg./kg.
Example VIII — $DLM=450$ mg./kg.; $DL_{50}=300$ mg./kg.
Example X — $DLM=400$ mg./kg.; $DL_{50}=250$ mg./kg.

We claim:

1. A process for preparing an insecticidal active polychlorinated mixture, which process comprises (a) partially chlorinating a member selected from the group consisting of alpha-pinene and beta-pinene with a mixture of from 90 to 95 percent by weight of anhydrous hydrogen chloride and from 10 to 5 percent by weight of anhydrous chlorine gas at a temperature of at most 30° C., continuing the partial chlorination until cooling is no longer required to maintain a temperature of at most 30° C. and (b) chlorinating the partially chlorinated product at a temperature of at least about 60° C. with chlorine until the resultant chlorinated mixture contains from 62 to 69 percent by weight of organically combined chlorine.

2. A process for preparing an insecticidally active material, which process comprises (a) partially chlorinating at a temperature of at most 30° C. a mixture of alpha-pinene and beta-pinene with a mixture which consists of (1) at least 50 percent by weight of anhydrous hydrogen chloride and (2) at least 5 percent by weight of anhydrous chlorine gas, continuing the partial chlorination until cooling is no longer required to maintain the temperature of at most 30° C., and (b) chlorinating the partially chlorinated product at a temperature of at least about 60° C. with chlorine until the resultant chlorinated mixture contains from 62 to 69 percent by weight of organically combined chlorine.

References Cited in the file of this patent
UNITED STATES PATENTS

| | | |
|---|---|---|
| 2,565,471 | Buntin | Aug. 28, 1951 |
| 2,579,296 | Buntin | Dec. 18, 1951 |
| 2,579,298 | Buntin | Dec. 18, 1951 |
| 2,579,299 | Buntin | Dec. 18, 1951 |
| 2,579,300 | Buntin | Dec. 18, 1951 |
| 2,579,301 | Buntin | Dec. 18, 1951 |
| 2,657,164 | Buntin | Oct. 27, 1953 |
| 2,657,166 | Stonecipher | Oct. 27, 1953 |
| 2,657,167 | Walton | Oct. 27, 1953 |
| 2,767,115 | Schultz | Oct. 16, 1956 |

OTHER REFERENCES

King: U.S. Dept. Agr., Handbook No. 69, 1954, pp. 274, 322.